(12) United States Patent
Kodama et al.

(10) Patent No.: US 8,852,055 B2
(45) Date of Patent: Oct. 7, 2014

(54) VEHICLE DRIVE CONTROL APPARATUS

(71) Applicants: Shinya Kodama, Toyota (JP); Motonari Ohbayashi, Nissin (JP); Yuki Minase, Toyota (JP); Masashi Takagi, Nagoya (JP); Toshihiro Takagi, Toyota (JP)

(72) Inventors: Shinya Kodama, Toyota (JP); Motonari Ohbayashi, Nissin (JP); Yuki Minase, Toyota (JP); Masashi Takagi, Nagoya (JP); Toshihiro Takagi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 134 days.

(21) Appl. No.: 13/687,002

(22) Filed: Nov. 28, 2012

(65) Prior Publication Data

US 2013/0133455 A1 May 30, 2013

(30) Foreign Application Priority Data

Nov. 29, 2011 (JP) .................. 2011-260566

(51) Int. Cl.
- *B60W 10/04* (2006.01)
- *B60W 10/10* (2012.01)
- *F16H 63/50* (2006.01)
- *F02D 29/02* (2006.01)
- *F16H 59/02* (2006.01)
- *F16H 59/10* (2006.01)
- *F16H 59/18* (2006.01)

(52) U.S. Cl.
CPC .............. *F16H 59/02* (2013.01); *F16H 63/50* (2013.01); *F02D 29/02* (2013.01); *F16H 59/10* (2013.01); *F16H 59/18* (2013.01)

USPC ........................................ 477/111

(58) Field of Classification Search
CPC . B60W 10/04; B60W 10/10; B60W 2510/10; B60W 2720/106
USPC ................................. 477/109, 111
See application file for complete search history.

(56) References Cited

U.S. PATENT DOCUMENTS

| 6,392,535 B1 * | 5/2002 | Matsuno et al. ............... 340/441 |
| 2009/0054205 A1 * | 2/2009 | Maekawa et al. ............. 477/109 |
| 2010/0006358 A1 | 1/2010 | Ishikawa |

FOREIGN PATENT DOCUMENTS

| JP | 61-190135 A | 8/1986 |
| JP | 2010-18174 A | 1/2010 |
| WO | 2012/176323 A1 | 12/2012 |

* cited by examiner

Primary Examiner — Edwin A Young
(74) Attorney, Agent, or Firm — Sughrue Mion, PLLC

(57) ABSTRACT

Provided is a vehicle drive control apparatus including a shift mechanism configured to be able to selectively switch its shift position to either a driving position or a non-driving position; and a controller configured to control the drive force output from a motor serving as a drive source of the vehicle according to operation of an accelerator, to transmit the drive force from the motor to wheels when the shift position is in the driving position, and to stop the transmission of the drive force from the motor to the wheels when the shift position is in the non-driving position. The controller also performs drive force suppression processing to control the drive force, when the shift position is switched from the non-driving position to the driving position with the accelerator turned ON, such that the acceleration of the vehicle does not exceed an upper limit of acceleration.

10 Claims, 4 Drawing Sheets

VEHICLE DRIVE CONTROL APPARATUS

INCORPORATION BY REFERENCE

The disclosure of Japanese Patent Application No. 2011-260566 filed on Nov. 29, 2011 including the specification, drawings and abstract is incorporated herein by reference in its entirety.

BACKGROUND OF THE INVENTION

1. Field of the Invention

The invention relates to a vehicle drive control apparatus for controlling drive force output from a motor functioning as a drive source of the vehicle according to operation of an accelerator.

2. Description of the Related Art

As described in Japanese Patent Application Publication No. 61-190135 (JP-61-190135 A), a vehicle such as an automobile has a controller which controls drive force output from a motor according to a driver's operation of an accelerator, and the vehicle is driven by transmitting the drive force output from the motor to wheels. The vehicle further has a shift mechanism which enables the driver to selectively switch the shift position either to a driving position or a non-driving position. When the shift position is in the driving position, the drive force is transmitted from the motor to the wheels, whereas when the shift position is in the non-driving position, the transmission of the drive force from the motor to the wheels is suspended.

When a driver tries to start a vehicle from a stopped position, the driver usually switches the shift position from the non-driving position to the driving position before operating the accelerator to turn it from OFF to ON. However, if the driver is in hurry, for example, he/she may possibly turn the accelerator ON before switching the shift position from the non-driving position to the driving position. If this happens, even though the driver intends to perform normal operation as described above, the operation actually may result in unusual one in which, for example, the shift position is switched to the driving position with the accelerator turned ON.

If the driver unconsciously performs an operation that is different from the normal one as described above, the actual behavior of the vehicle may differ from the one that is intended by the driver. Specifically, whereas the driver intends to start the vehicle upon turning the accelerator ON, the vehicle is actually not started until the shift position is switched to the driving position after the accelerator is turned ON and the drive force is transmitted from the motor to the wheels. When the drive force of the motor is transmitted to the wheels after the shift position is switched to the driving position with the accelerator turned ON, this may give the driver a sense of discomfort or strangeness.

SUMMARY OF THE INVENTION

The invention has been done in view of the circumstances as described above, and an object of the invention is to provide a vehicle drive control apparatus capable of appropriately suppressing the a sense of discomfort given to the driver when the shift position is shifted from the non-driving position to the driving position with the accelerator turned ON.

An aspect of the invention provides a vehicle drive control apparatus including: a shift mechanism configured to be able to selectively switch a shift position thereof to either a driving position or a non-driving position; and a controller configured to control the drive force output from a motor serving as a drive source of the vehicle according to operation of an accelerator, to transmit the drive force from the motor to wheels when the shift position is in the driving position, and to stop the transmission of the drive force from the motor to the wheels when the shift position is in the non-driving position, the controller further configured to perform drive force suppression processing to control the drive force, when the shift position is switched from the non-driving position to the driving position with the accelerator turned ON, such that the acceleration of the vehicle does not exceed an upper limit of acceleration.

The circumstance in which the shift position is switched from the non-driving position to the driving position with the accelerator turned ON can occur, for example, when the driver hastily tries to start the vehicle from a stopped position and unconsciously turns the accelerator ON before switching the shift position. Under such circumstances, if the drive force is transmitted from the motor to the wheels when the shift position is switched from the non-driving position to the driving position with the accelerator turned ON, this may possibly provide a sense of discomfort or strangeness to the driver.

In the aforementioned vehicle drive control apparatus, the drive force suppression processing is performed under such circumstances to control the drive force output from the motor such that the acceleration of the vehicle does not exceed the upper limit of acceleration. This makes it possible to prevent the acceleration of the vehicle from exceeding the upper limit of acceleration. Accordingly, any sense of discomfort given to the driver when the shift position is switched from the non-driving position to the driving position with the accelerator turned ON can be effectively suppressed.

In the vehicle drive control apparatus, the controller may preferably provide a predetermined delay time after the acceleration of the vehicle has exceeded the upper limit of acceleration and before the reduction of the drive force is started.

It is desirable to set the upper limit of acceleration low in the drive force suppression processing in order to suppress discomfort or strangeness that the driver might feel under such circumstances. When the shift position is switched from the non-driving position to the driving position with the accelerator turned ON, this operation to turn ON the accelerator is sometimes to start the vehicle for the purpose of bringing the vehicle out of a muddy road. In this case, when the vehicle is moved back and forth, especially when the traveling direction is switched over, the force acting on the engine output shaft from the wheels is increased against the drive force output from the internal combustion engine, whereby the drive force output from the internal combustion engine is caused to fluctuate and to temporarily drop significantly. Therefore, if the upper limit of acceleration is set low as described above, the drive force output from the internal combustion engine becomes insufficient, and it may possibly take a long time to bring the vehicle out of the muddy road. When the shift position is switched between DRIVE position and REVERSE position, both of which are the driving positions, in order to move the vehicle back and forth, the shift position is switched via NEUTRAL position that is located between the DRIVE position and the REVERSE position. This will result in a circumstance in which the shift position is switched from the NEUTRAL position, that is the non-driving position, to the driving position.

In the foregoing vehicle drive control apparatus, the reduction of the drive force is not started immediately after the acceleration of the vehicle has exceeded the upper limit of acceleration in the drive force suppression processing, but it is started after elapse of a predetermined delay time. This makes it possible to effectively prevent the drive force output from the internal combustion engine from becoming insufficient when the vehicle is moved back and forth in a muddy road even if the upper limit of acceleration is set low in the drive force suppression processing.

Further, in the vehicle drive control apparatus, when the shift position is switched from the non-driving position to the driving position with the accelerator turned ON, the controller may preferably change the predetermined delay time according to a time required to terminate fluctuation of the drive force caused by such switching of the shift position.

When the shift position is switched from the non-driving position to the driving position with the accelerator turned ON, the speed ratio of the transmission differs and hence the time required to terminate and stabilize the fluctuation of the drive force output from the internal combustion engine also differs between, for example, when the shift position is shifted to the forward driving position and when shifted to the reverse driving position.

In the vehicle drive control apparatus as described above, the predetermined delay time is set according to a time required to terminate the fluctuation of the drive force. This makes it possible to set the predetermined delay time appropriately and to effectively prevent the occurrence of circumstances in which the drive force output from the internal combustion engine becomes insufficient.

Further, in the vehicle drive control apparatus, when the speed ratio of a transmission differs between when the shift position is in the reverse driving position and when in the forward driving position, the controller may preferably change the predetermined delay time according to the shift position.

For example, in a vehicle in which the speed ratio of its transmission is higher when the shift position is in the reverse driving position than when in the forward driving position, it takes a longer time to terminate and stabilize the fluctuation of drive force output from the internal combustion engine when the shift position is shifted to the forward driving position than when switched to the reverse driving position. According to the above configuration, the predetermined delay time is set to be longer when the shift position is shifted to the forward driving position than when switched to the reverse driving position. This makes it possible to assess, according to the shift position, the time required to terminate the fluctuation of the drive force caused by switching of the shift position, and makes it possible to set the predetermined delay time easily and appropriately according to the time thus assessed.

Further, in the vehicle drive control apparatus, when the speed ratio of the transmission is higher when the shift position is in the reverse driving position than when in the forward driving position, the controller may preferably set the predetermined delay time to be longer when the shift position is switched to the forward driving position than when switched to the reverse driving position.

When the speed ratio of the transmission is lower when the shift position is in the reverse driving position than when in the forward driving position, the controller may preferably set the predetermined delay time to be shorter when the shift position is switched to the forward driving position than when switched to the reverse driving position.

Further, when the speed ratio of the transmission when the shift position is in the reverse driving position is the same as that when the shift position is in the forward driving position, the controller may preferably set the predetermined delay time when the shift position is switched to the forward driving position to the same value as when the shift position is switched to the reverse driving position.

In a vehicle in which the speed ratio of its transmission is higher when the shift position is in the reverse driving position than when in the forward driving position, the controller may set the predetermined delay time to be longer when the shift position is switched to the forward driving position than when switched to the reverse driving position. In a vehicle in which the speed ratio of the transmission is lower when the shift position is in the reverse driving position than when in the forward driving position, the controller may set the predetermined delay time to be shorter. When the speed ratio of the transmission is the same, the controller may set the predetermined delay time to the same value.

In the vehicle drive control apparatus, the controller may preferably set the upper limit of acceleration to a lower value when the traveling speed of vehicle is high than when the traveling speed is low.

In the drive force suppression processing, if the upper limit of acceleration is set to a fixed value regardless of traveling speed of the vehicle, it may lead to inconveniences as described below. For example, if the upper limit of acceleration is set to a large value in the same manner as when the traveling speed is low, the driver will experience a sense of discomfort depending on a reduction mode of drive force when the traveling speed of the vehicle is increased, even if the acceleration of the vehicle is not more than the upper limit of acceleration.

In contrast, in the vehicle drive control apparatus described above, the upper limit of acceleration is set to a lower value when the traveling speed of the vehicle is high than when the traveling speed of the vehicle is low. This makes it possible to appropriately suppress the drive force in the drive force suppression processing.

Further, the controller may preferably keep the upper limit of acceleration at a fixed value until the traveling speed of the vehicle reaches a predetermined traveling speed, and once the traveling speed exceeds the predetermined traveling speed, the controller may preferably reduce the upper limit of acceleration as the traveling speed becomes higher.

Further, in the vehicle drive control apparatus, the motor may preferably include at least either an internal combustion engine or an electric motor.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
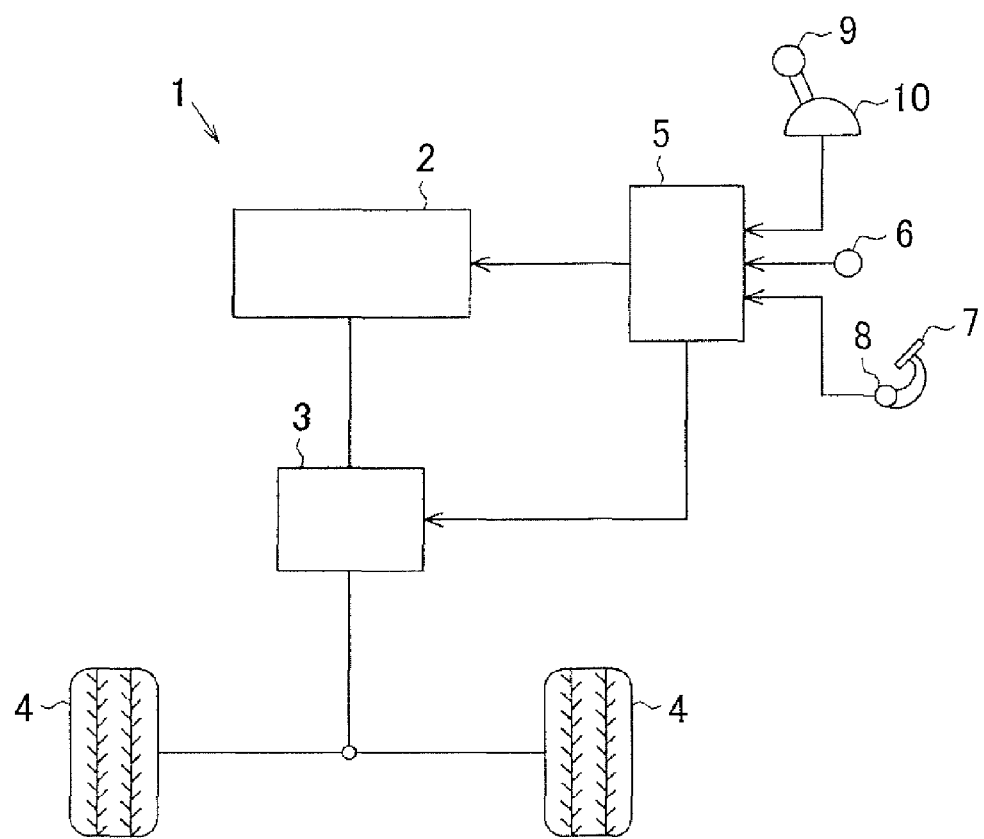
FIG. 1 is a schematic diagram showing a general configuration of a vehicle for describing a vehicle drive control apparatus according to an embodiment of the invention.

Referring to FIG. 1 to FIG. 4, an embodiment of a vehicle drive control apparatus according to the invention will be described. As shown in FIG. 1, a vehicle 1 has an internal combustion engine 2 serving as a drive source, and a transmission 3 for transmitting drive force output from the internal combustion engine 2 to wheels 4.

The vehicle 1 has an internal combustion engine 2 and an electronic controller 5 for performing various types of control in relation to the transmission 3. The electronic controller 5 is composed of a central processing unit (CPU) performing arithmetic processing relating to various types of control, a read-only memory (ROM) storing a program or data for the various type of control, and a random access memory (RAM) temporarily storing a result of the arithmetic processing or the like. The electronic controller 5 reads detection signals from sensors, performs various type of arithmetic processing, and controls the internal combustion engine 2 and the transmission 3 in an integrated manner based on results of the arithmetic processing.

The sensors include a speed sensor 6 detecting a traveling speed of the vehicle 1 (hereafter, referred to as vehicle speed SPD), an accelerator operation amount sensor 8 detecting a depression amount of an accelerator pedal 7 (hereafter, referred to as accelerator operation amount ACCP), a shift position sensor 10 detecting a position of a shift lever 9 (hereafter, shift position PS), and the like.

The electronic controller 5 adjusts the drive force output from the internal combustion engine 2 according to an accelerator operation amount ACCP. In addition, the electronic controller 5 switches the gear selection of the transmission 3 and performs transmission and interruption of drive force between the internal combustion engine 2 and the wheels 4, according to an accelerator operation amount ACCP, a vehicle speed SPD, and a shift position PS. The shift lever 9 is switchable to any one of a plurality of positions, namely PARKING position, REVERSE position, NEUTRAL position, and DRIVE position.

A description will be made of a drive mode of the transmission 3 at each position of the shift lever 9. When the shift lever 9 is switched to the PARKING position, rotation of the wheels 4 is inhibited by engagement of gears in the transmission 3, while the transmission 3 is driven so as to interrupt the transmission of drive force output from the internal combustion engine 2 to the wheels 4.

When the shift lever 9 is switched to the NEUTRAL position, the inhibition of rotation of the wheels 4 by the engagement of the gears in the transmission 3 is released, while the transmission 3 is driven so as to interrupt the transmission of drive force output from the internal combustion engine 2 to the wheels 4.

When the shift lever 9 is switched to the DRIVE position, the transmission 3 is driven such that the drive force output from the internal combustion engine 2 is transmitted to the wheels 4 in a positive rotation direction. This causes the vehicle 1 to assume a state capable of traveling forward.

When the shift lever 9 is switched to the REVERSE position, the transmission 3 is driven such that the drive force output from the internal combustion engine 2 is transmitted to the wheels 4 in a reverse rotation direction. This causes the vehicle 1 to assume a state capable of traveling rearward. In this embodiment, the speed ratio of the transmission 3 is set to be greater when the shift position PS is in the REVERSE position than when in the DRIVE position.

In other words, the PARKING position and the NEUTRAL position correspond to non-driving position, while the DRIVE position and the REVERSE position correspond to driving position. The DRIVE position corresponds to forward driving position, and the REVERSE position corresponds to reverse driving position.

As mentioned in the above, a driver, who is about to start the vehicle 1 from the stopped state, normally depresses the accelerator pedal 7 after switching the shift position PS from the non-driving position to the driving position. In other words, the driver operates the accelerator pedal 7 to switch the same from the OFF state to the ON state. However, if the driver is in haste, for example, the driver may possibly operate the accelerator pedal 7 to turn the same ON before switching the shift position PS from the non-driving position to the driving position. In such a case, even though the driver intends to perform normal operation as described above, the operation actually may result in unusual one in which, for example, the shift position is switched to the driving position with the accelerator pedal 7 turned ON.

If the driver unconsciously performs an unusual operation as described above, the actual behavior of the vehicle 1 may differ from the one that the driver intends to do. Specifically, for example whereas the driver intends to start the vehicle 1 upon turning the accelerator pedal ON, the vehicle is actually not started until the shift position PS is switched to the driving position after the accelerator pedal 7 is turned ON and the drive force of the internal combustion engine 2 is transmitted to the wheels 4. When the drive force of the internal combustion engine 2 is transmitted to the wheels 4 after the shift position PS is shifted to the driving position with the accelerator pedal 7 turned ON, this may give the driver a sense of discomfort or strangeness.

In order to prevent such inconveniences, this embodiment is configured such that, if the shift position PS is switched from the non-driving position to the driving position with the accelerator pedal 7 turned ON, the electronic controller 5 performs drive force suppression processing to control the drive force output from the internal combustion engine 2 such that the actual acceleration Ar of the vehicle does not exceed the upper limit of acceleration Ath.

In order to suppress the discomfort that the driver might feel under the circumstances described above, it is desirable to set the upper limit of acceleration Ath to a low value in the drive force suppression processing. When the shift position PS is switched from the non-driving position to the driving position with the accelerator pedal 7 turned ON, this operation of turning ON the accelerator pedal 7 is sometimes a starting operation for bringing the vehicle 1 out of a muddy road. In this case, when the vehicle 1 is moved back and forth, the force applied on an engine output shaft from the wheels 4 against the drive force output from the internal combustion engine 2 is increased especially at the time when the traveling direction of the vehicle 1 is switched over. As a result, the drive force output from the internal combustion engine 2 will be caused to fluctuate and will temporarily drop significantly. Therefore, if the upper limit of acceleration Ath is set to a low value as described above, the drive force output from the internal combustion engine 2 is so short that it takes a long time to bring the vehicle out of the muddy road. When the shift position PS is switched between the DRIVE position and the REVERSE position, both of which are the driving positions, in order to move the vehicle 1 back and forth, the shift position PS is switched via the NEUTRAL position that is located between the DRIVE position and the REVERSE position. Accordingly, the shift position PS switched from the NEUTRAL position, or the non-driving position, to the driving position.

In this embodiment, a predetermined delay time τ is provided between when the actual acceleration Ar of the vehicle exceeds the upper limit of acceleration Ath and when the drive force output from the internal combustion engine 2 starts dropping. Further, when the shift position PS is switched from the non-driving position to the driving position with the accelerator pedal 7 turned ON, the predetermined delay time τ is changed according to a time required to terminate the fluctuation of the drive force caused by the switching of the shift position PS. Specifically, the predetermined delay time τ is set longer when the shift position PS is switched to the DRIVE position than when switched to the REVERSE position.

If the upper limit of acceleration is set to a fixed value regardless of the vehicle speed SPD in the drive force suppression processing, the following inconveniences may occur. For example, if the upper limit of acceleration is set to the same large value when the vehicle speed SPD is high as when the vehicle speed SPD is low, the driver may feel a sense of discomfort depending on the reduction mode of the drive force when the vehicle speed SPD is increased, even if the actual acceleration Ar of the vehicle is not higher than the upper limit of acceleration Ath.

Figure 4:
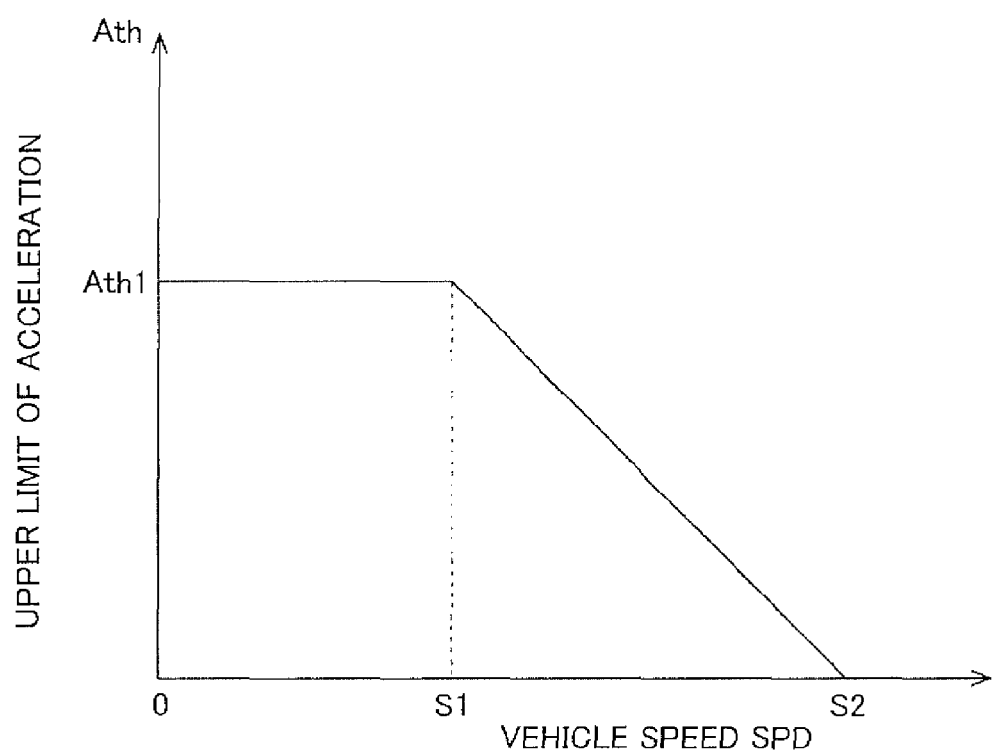
FIG. 4 is a graph showing a relationship between vehicle speed and upper limit of acceleration according to the embodiment.

Therefore, in this embodiment, in order to properly prevent the insufficient suppression of the drive force in the drive force suppression processing, the upper limit of acceleration Ath is set to a smaller value when the vehicle speed SPD is high than when it is low, as shown in FIG. 4.

Next, the operation of the embodiment will be described. When the shift position PS is switched from the non-driving position to the driving position with the accelerator pedal 7 turned ON, the drive force suppression processing is performed to control the drive force output from the internal combustion engine 2 so that the actual acceleration Ar of the vehicle does not exceed the upper limit of acceleration Ath. Thus, the actual acceleration Ar of the vehicle is prevented from exceeding the upper limit of acceleration Ath.

Further, when the actual acceleration Ar of the vehicle exceeds the upper limit of acceleration At in the drive force suppression processing, the reduction of the drive force is not started immediately, but it is started after a predetermined delay time τ.

Further, when the shift position PS is switched from the non-driving position to the driving position with the accelerator pedal 7 turned ON, the predetermined delay time τ is changed according to a time required to terminate the fluctuation of the drive force caused by the switching of the shift position PS. Specifically, the predetermined delay time τ is longer when the shift position PS is switched to the DRIVE position than when switched to the REVERSE position.

Description will be made of a reason why the predetermined delay time τ is set variably according to the shift position PS. When the shift position PS is switched from the non-driving position to the driving position with the accelerator pedal 7 turned ON, the speed ratio of the transmission 3 is differs, and hence the time required to terminate and stabilize the fluctuation of the drive force output from the internal combustion engine 2 differs between when the shift position is switched to the DRIVE position and when switched to the REVERSE position, for example. In the embodiment, as described above, the speed ratio of the transmission 3 is set to a greater value when the shift position PS is in the REVERSE position than when in the DRIVE position. Therefore, the time required to terminate and stabilize the fluctuation of the drive force output from the internal combustion engine 2 is longer when the shift position PS is switched to the DRIVE position than when switched to the REVERSE position. The embodiment, therefore, focuses on the fact that the time required to terminate the fluctuation of the drive force differs according to the shift position PS and sets the predetermined delay time τ variably according to the shift position PS.

Next, referring to the flowcharts of FIG. 2 and FIG. 3, the procedure for executing the drive restriction routine including the drive force suppression processing will be described in detail. The series of processing steps shown in these flowcharts are periodically performed in an interrupt manner at predetermined time intervals, while being controlled by the electronic controller 5.

Figure 2:
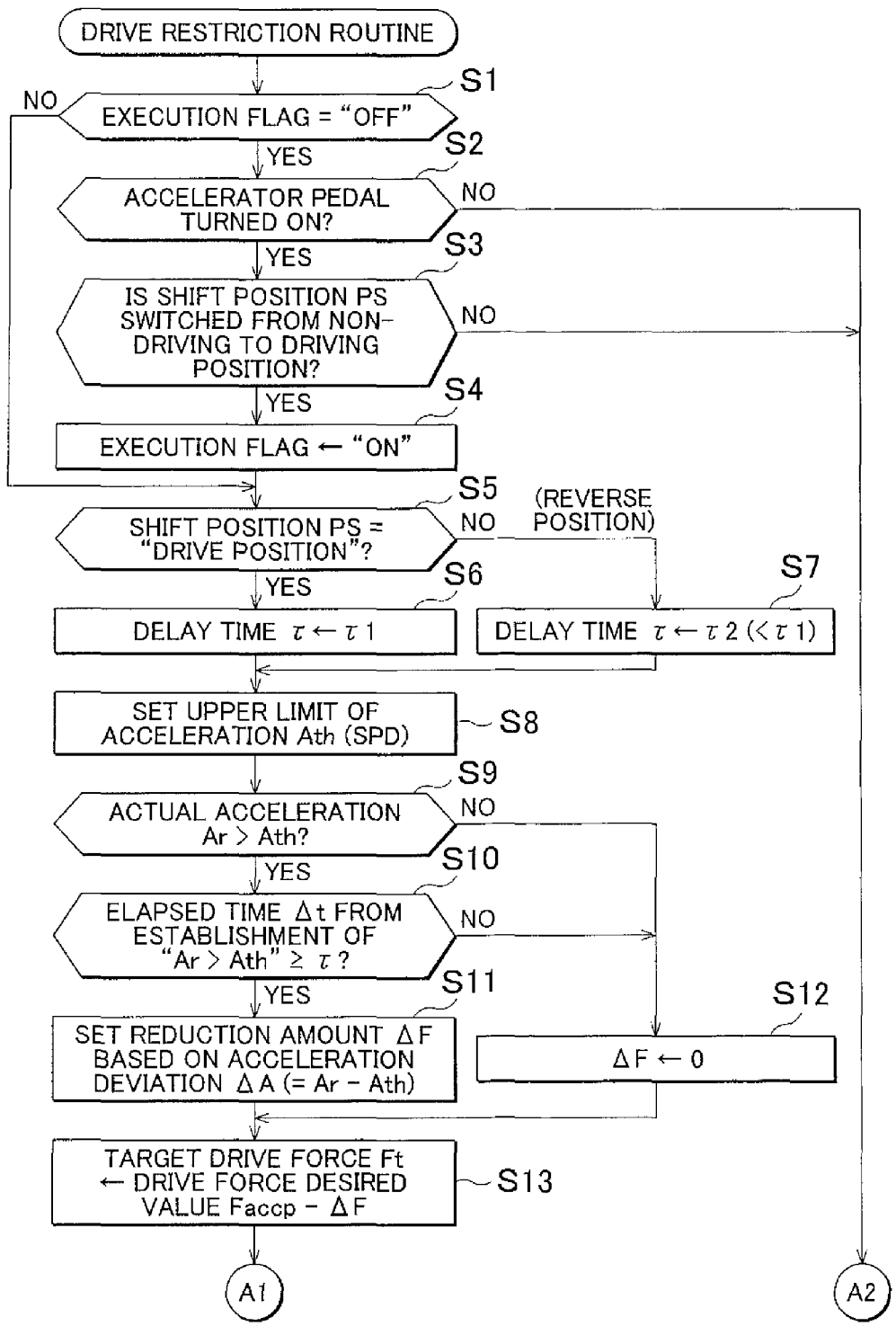
FIG. 2 is a flowchart showing upstream steps in the procedures for executing a drive restriction routine according to the embodiment.

Firstly in the series of processing steps shown in FIG. 2, it is determined whether or not the execution flag is OFF (step S1). The execution flag is turned ON when the drive force suppression processing is performed, whereas it is turned OFF when the execution of the drive force suppression processing is suspended. Therefore, the execution flag is OFF in the first control cycle.

When the execution flag is OFF ("YES" in step S1), it is determined that the drive force suppression processing is not performed, and then it is determined whether or not the execution of the drive force suppression processing is to be started. Specifically, it is firstly determined whether or not the accelerator pedal 7 is turned ON (step S2). When the accelerator pedal 7 is not turned ON ("NO" in step S2), it is determined that the execution of the drive force suppression processing should not be started, and the series of processing is once terminated (see A2 shown in FIG. 2 and FIG. 3).

In contrast, when the accelerator pedal 7 is turned ON ("YES" in step S2), it is then determined whether or not the shift position PS has been switched from the non-driving position (PARKING position or NEUTRAL position) to the driving position (DRIVE position or REVERSE position) (step S3). When the shift position PS has not been switched from the non-driving position to the driving position ("NO" in step S3), it is determined that the execution of the drive force suppression processing should not be started and the series of processing is once terminated (see A2 shown in FIG. 2 and FIG. 3).

When the shift position PS has been switched from the non-driving position to the driving position ("YES" in step S3), specifically, when the shift position PS has been switched from the non-driving position to the driving position with the accelerator pedal 7 turned ON, the execution flag is turned ON in order to execute the drive force suppression processing (step S4). It is then determined whether or not the switched shift position PS is in the DRIVE position (step S5). When the switched shift position PS is in the DRIVE position ("YES" in step S5), the predetermined delay time τ is set to a first predetermined time τ1 (step S6). When the switched shift position PS is not in the DRIVE position ("NO" in step S5), that is, when it is in the REVERSE position, the predetermined delay time is set to a second predetermined time τ2 that is shorter than the first predetermined time (τ2<τ1) (step S7). In the embodiment, the first predetermined time τ1 is set, for example, to 400 milliseconds, while the second predetermined time τ2 is set to 300 milliseconds. These delay times τ are preset through experiments or the like so as to prevent shortage of the drive force output from the internal combustion engine 2 when the vehicle 1 is moved back and forth to bring the vehicle 1 out of the muddy road.

After the predetermined delay times τ are set in this manner, the upper limit of acceleration Ath is set based on a vehicle speed SPD at that time. Specifically, as shown in FIG. 4, the upper limit of acceleration Ath is set to a first upper limit Ath1 (fixed) in the range of the vehicle speed SPD from "zero" to a first predetermined speed S1, and then the upper limit of acceleration Ath is decreased as the vehicle speed SPD is increased in the range from the first predetermined speed S1 to a second predetermined speed S2. When the vehicle speed SPD is the second predetermined speed S2 or more, the upper limit of acceleration Ath is set to "zero". Such relationship between vehicle speed SPD and upper limit of acceleration Ath is preset through experiments or the like such that the drive force output from the internal combustion engine 2 is decreased while being kept in a range that ensures sufficient drive force to bring the vehicle out of the muddy road.

Once the upper limit of acceleration Ath is set in this manner, it is then determined whether or not the current actual acceleration Ar is higher than the upper limit of acceleration Ath (step S9). The actual acceleration Ar of the vehicle is calculated based on a detection result of the vehicle speed SPD. When the actual acceleration Ar is not higher than the upper limit of acceleration Ath ("NO" in step S10), a reduction amount ΔF is set to "zero" (step S12), and the processing proceeds to step S13. This reduction amount ΔF is a correction amount to reduce a drive force target value Ft that is a control target value of the drive force output from the internal combustion engine 2 such that the actual acceleration Ar becomes the upper limit of acceleration Ath when the actual acceleration Ar is higher than the upper limit of acceleration Ath.

When the actual acceleration Ar is higher than the upper limit of acceleration Ath ("YES" in step S9), it is then determined whether or not the elapsed time Δt after the actual acceleration Ar has exceeded the upper limit of acceleration Ath is equal to or more than the predetermined delay time τ (step S10). When the elapsed time Δt is less than the predetermined delay time τ ("NO" in step S10), the processing proceeds to step S12, in which the reduction amount ΔF is set to "zero", and then proceeds to step S13.

In contrast, when the elapsed time Δt is equal to or more than the predetermined delay time τ ("YES" in step S10), the reduction amount ΔF is set based on a deviation between the current actual acceleration Ar and the upper limit of acceleration Ath (hereafter, referred to as acceleration deviation ΔA). Specifically, when the actual acceleration Ar is higher than the upper limit of acceleration Ath, the reduction amount ΔF is set to a greater value as the acceleration deviation ΔA becomes greater.

Once the reduction amount ΔF is set in this manner (step S11 or S12), the drive force target value Ft is then set according to the following formula (1) (step S13).

$$Ft \leftarrow Faccp - \Delta F \quad (1)$$

More specifically, the drive force target value Ft is set to a value obtained by subtracting the reduction amount ΔF from a drive force desired value Faccp that is set based on the accelerator operation amount ACCP. The internal combustion engine 2 is controlled based on this drive force target value Ft.

Figure 3:
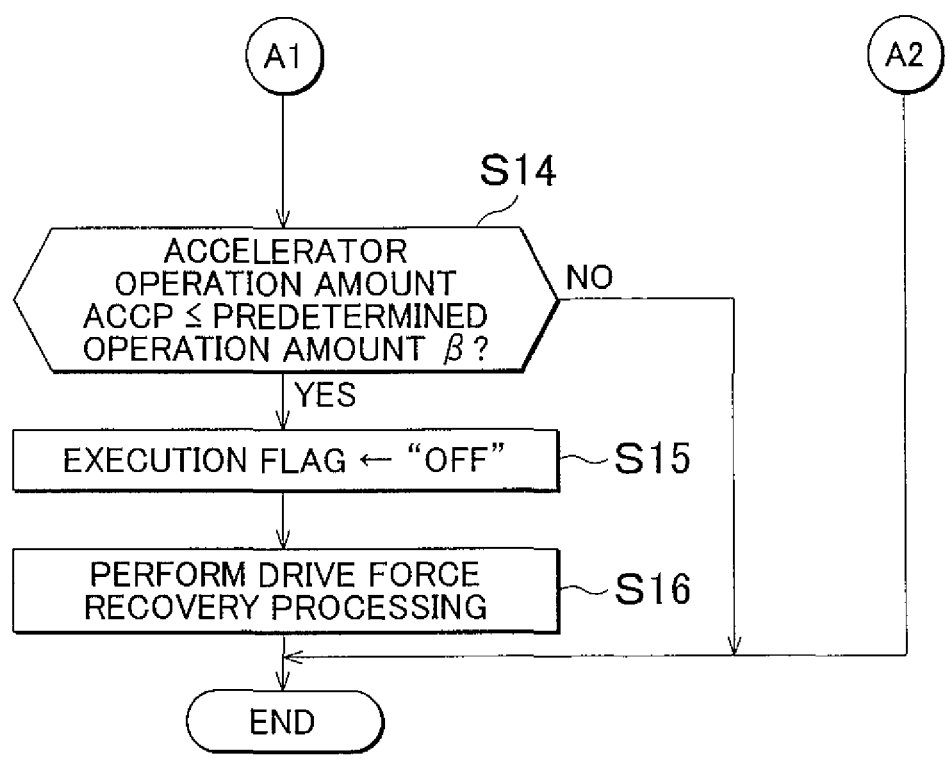
FIG. 3 is a flowchart showing downstream steps in the procedures for executing the drive restriction routine according to the embodiment.

After the drive force suppression processing is executed in this manner, it is then determined, as shown in FIG. 3, whether or not drive force recovery processing should be executed. The drive force recovery processing is processing for recovering the drive force output from the internal combustion engine 2. Specifically, it is determined whether or not the accelerator operation amount ACCP has been reduced to be a predetermined operation amount β or less (step S14). In this embodiment, the predetermined operation amount β corresponds to an accelerator operation amount ACCP in an idling state.

When the accelerator operation amount ACCP is not equal to or less than the predetermined operation amount β ("NO" in step S14), it is determined that the drive force suppression processing should be continued while the execution of the drive force recovery processing should not be started, and the series of processing is once terminated.

In contrast, when the accelerator operation amount ACCP is equal to or less than the predetermined operation amount β ("YES" in step S14), the execution flag is turned OFF in order to stop the execution of the drive force suppression processing (step S15). The drive force recovery processing is then executed, and the series of processing is once terminated.

In the drive force recovery processing, the drive force target value Ft is gradually varied from the value set based on the formula (1) above to a value set based on the following formula (2).

$$Ft \leftarrow Faccp \quad (2)$$

Specifically, the drive force target value Ft is gradually varied to the drive force desired value Faccp that is set based on the accelerator operation amount ACCP while the internal combustion engine 2 is controlled based on this drive force target value Ft.

It should be noted that the electronic controller 5 is an example of a controller, and the shift lever 9 is an example of a shift mechanism. The vehicle drive control apparatus according to the embodiment described above provides advantageous effects as listed below.

(1) The electronic controller 5 is configured to execute the drive force suppression processing when the shift position PS is switched from the non-driving position to the driving position with the accelerator pedal 7 turned ON, so that the drive force output from the internal combustion engine 2 is controlled to prevent the actual acceleration Ar of the vehicle from exceeding the upper limit of acceleration Ath. This configuration makes it possible to effectively suppress the discomfort or strangeness that the driver might feel when the shift position PS is switched from the non-driving position to the driving position with the accelerator pedal 7 turned ON.

(2) A predetermined delay time τ is provided between when the actual acceleration Ar of the vehicle exceeds the upper limit of acceleration Ath and when reduction of the drive force output from the internal combustion engine 2 is started. Therefore, even if the upper limit of acceleration Ath is set low in the drive force suppression processing, shortage of the drive force output from the internal combustion engine 2 can be effectively prevented when the vehicle 1 is moved back and forth in a muddy road.

(3) The speed ratio of the transmission 3 is set higher when the shift position PS is in the REVERSE position than when in the DRIVE position. In addition, the predetermined delay time τ is set longer when the shift position PS is switched to the DRIVE position than when switched to the REVERSE position. This configuration makes it possible to set the predetermined delay time τ appropriately and to reliably prevent the occurrence of such a circumstance as that the drive force output from the internal combustion engine 2 becomes short. Further, the time required to terminate the fluctuation of the drive force caused by switching of the shift position PS can be assessed according to the shift position PS, and hence the predetermined delay time τ can be set easily and appropriately according to the time thus evaluated.

(4) The electronic controller 5 is configured such that the upper limit of acceleration Ath is set to a lower value when the vehicle speed SPD is high than when the vehicle speed SPD is low. This configuration makes it possible to suppress the drive force appropriately in the drive force suppression processing.

It should be understood that the configuration of the vehicle drive control apparatus according to the invention is not limited to the one described by way of example in the foregoing embodiment, but may be modified in various ways as described below. In the embodiment described above, the internal combustion engine 2 is described as an example of the motor functioning as a drive source for the vehicle 1. However, the motor according to the invention is not limited to this, but may be a motor composed both of an internal combustion engine and an electric motor, or may be a motor composed only of an electric motor.

Although in the embodiment described above, the accelerator pedal 7 is described as an example of the accelerator, the accelerator is not limited to the one that is operated by the driver's foot. For example, an accelerator lever that is operated by the driver's hand may be employed in place of the accelerator pedal.

The relationship between the vehicle speed SPD and the upper limit of acceleration Ath is not limited to the one that is described by way of example in the foregoing embodiment, but may be modified as appropriate. As described in the embodiment, it is desirable to set the upper limit of acceleration Ath to a lower value when the vehicle speed SPD is high than when the vehicle speed SPD is low, in order to appropriately limit the drive force F output from the internal combustion engine 2. However, the invention is not limited to such configuration that the upper limit of acceleration Ath is variably set according to the vehicle speed SPD, and the upper limit of acceleration can be a fixed value regardless of the vehicle speed SPD.

In the foregoing embodiment, the vehicle 1 is configured such that the speed ratio of the transmission 3 is set higher when the shift position PS is in the REVERSE position than when in the DRIVE position. However, the invention is also applicable to a vehicle which is configured such that the speed ratio of the transmission is set lower when the shift position PS is in the REVERSE position than when in the DRIVE position. In this case, the predetermined delay time τ should be set shorter when the shift position PS is switched from the non-driving position to the DRIVE position than when switched to the REVERSE position.

In the foregoing embodiment and modifications thereof, a vehicle has been described by way of example in which the speed ratio of the transmission differs between the DRIVE position and the REVERSE position. However, the vehicle may be one in which the speed ratio of the transmission is the same between the DRIVE position and the REVERSE position, and in this case, the predetermined delay time τ can be set to the same value.

The invention is not limited to the configuration in which the predetermined delay time τ is variably set based on the relationship between the speed ratio in the forward driving position and the speed ratio in the reverse driving position. For example, the predetermined delay time can be a fixed value regardless of such speed ratio. In this case, the control configuration of the vehicle drive control apparatus can be simplified.

It is desirable, as described in the embodiment, that a predetermined delay time τ is provided before the start of the reduction of the drive force, in order to appropriately prevent the drive force output from the internal combustion engine 2 from becoming short when the vehicle 1 is moved back and forth in a muddy road, while setting the upper limit of acceleration Ath low in the drive force suppression processing. However, such predetermined delay time need not be provided if the upper limit of acceleration is set to a rather high value in the drive force suppression processing. In short, any configuration can be employed as long as when the shift position is switched from the non-driving position to the driving position with the accelerator turned ON, the drive force suppression processing can be performed to control the drive force output from the motor such that the acceleration of the vehicle will not exceed the upper limit of acceleration.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle drive control apparatus comprising:
    a shift mechanism configured to be able to selectively switch a shift position thereof to either a driving position or a non-driving position; and
    a controller configured to control the drive force output from a motor serving as a drive source of the vehicle according to operation of an accelerator, to transmit the drive force from the motor to wheels when the shift position is in the driving position, and to stop the transmission of the drive force from the motor to the wheels when the shift position is in the non-driving position, the controller further configured to perform drive force suppression processing to control the drive force, when the shift position is switched from the non-driving position to the driving position with the accelerator turned ON, such that the acceleration of the vehicle does not exceed an upper limit of acceleration.

2. The vehicle drive control apparatus according to claim 1, wherein the controller provides a predetermined delay time after the acceleration of the vehicle has exceeded the upper limit of acceleration and before the reduction of the drive force is started.

3. The vehicle drive control apparatus according to claim 2, wherein when the shift position is switched from the non-driving position to the driving position with the accelerator turned ON, the controller changes the predetermined delay time according to a time required to terminate fluctuation of the drive force caused by this switching of the shift position.

4. The vehicle drive control apparatus according to claim 3, wherein when the speed ratio of a transmission differs between when the shift position is in a reverse driving position and when in a forward driving position, the controller changes the predetermined delay time according to the shift position to which the shift position is switched from the non-driving position.

5. The vehicle drive control apparatus according to claim 4, wherein when the speed ratio of the transmission is higher when the shift position is in the reverse driving position than when in the forward driving position, the controller sets the predetermined delay time to be longer when the shift position is switched to the forward driving position than when switched to the reverse driving position.

6. The vehicle drive control apparatus according to claim 4, wherein when the speed ratio of the transmission is lower when the shift position is in the reverse driving position than when in the forward driving position, the controller sets the predetermined delay time to be shorter when the shift position is switched to the forward driving position than when switched to the reverse driving position.

7. The vehicle drive control apparatus according to claim 4, wherein when the speed ratio of the transmission when the shift position is in the reverse driving position is the same as that when the shift position is in the forward driving position, the controller sets the predetermined delay time when the shift position is switched to the forward driving position to the same value as when the shift position is switched to the reverse driving position.

8. The vehicle drive control apparatus according to claim 1, wherein the controller sets the upper limit of acceleration to a lower value when the traveling speed of the vehicle is high than when the traveling speed is low.

9. The vehicle drive control apparatus according to claim 1, wherein the controller keeps the upper limit of acceleration at a fixed value until the traveling speed of the vehicle reaches a predetermined traveling speed, and once the traveling speed exceeds the predetermined traveling speed, the controller reduces the upper limit of acceleration as the traveling speed becomes higher.

10. The vehicle drive control apparatus according to claim 1, wherein the motor includes at least either an internal combustion engine or an electric motor.

* * * * *